(12) United States Patent
Edlinger

(10) Patent No.: US 6,261,340 B1
(45) Date of Patent: Jul. 17, 2001

(54) METHOD FOR TRANSFORMING SLAG DERIVED FROM NON-IRON METALLURGY

(75) Inventor: Alfred Edlinger, Baden (CH)

(73) Assignee: "Holderbank" Financiere Glarus AG, Glarus (CH)

(*) Notice: Subject to any disclaimer, the term of this patent is extended or adjusted under 35 U.S.C. 154(b) by 0 days.

(21) Appl. No.: 09/646,287

(22) PCT Filed: Mar. 16, 1999

(86) PCT No.: PCT/AT99/00066

§ 371 Date: Sep. 15, 2000

§ 102(e) Date: Sep. 15, 2000

(87) PCT Pub. No.: WO99/47715

PCT Pub. Date: Sep. 23, 1999

(30) Foreign Application Priority Data

Mar. 17, 1998 (AT) .......................................... 468/98

(51) Int. Cl.$^7$ .......................................... C22B 7/04
(52) U.S. Cl. .................. 75/585; 75/434; 75/500; 75/627; 75/629; 75/640
(58) Field of Search .............. 75/434, 500, 585, 75/627, 629, 640

(56) References Cited

U.S. PATENT DOCUMENTS

| 1,822,588 | 9/1931 | Fowler et al. . |
| 4,349,383 | 9/1982 | Chaudhuri . |
| 5,776,226 | * 7/1998 | Edlinger .............................. 75/500 |

FOREIGN PATENT DOCUMENTS

| 707 083 | 4/1996 | (EP) . |
| 801 136 | 10/1997 | (EP) . |

* cited by examiner

Primary Examiner—Melvyn Andrews
(74) Attorney, Agent, or Firm—Pillsbury Winthrop LLP

(57) ABSTRACT

In a method of converting slags derived from nonferrous metallurgy, in particular primary and secondary Ni and Cu metallurgical slags, while recovering and/or enriching the nonferrous metals and forming synthetic puzzolans, the molten oxidic slags are reduced with gases containing $H_2$ and CO such as, e.g., cracked gas in a first reduction stage above a metal bath containing Cu and/or Ni and optionally Co. The redox potential of the $CO/H_2$ mixture is reduced by adding 10 to 40% by volume $H_2O$ vapor and/or $CO_2$ in order to hold off the reduction of Fe oxides. Subsequently, the remaining slag free of Cu and Ni is further reduced above an iron bath while using carbon in order to reduce the portion of Fe oxides so as to produce a slag free of Fe and nonferrous heavy metals.

6 Claims, 1 Drawing Sheet

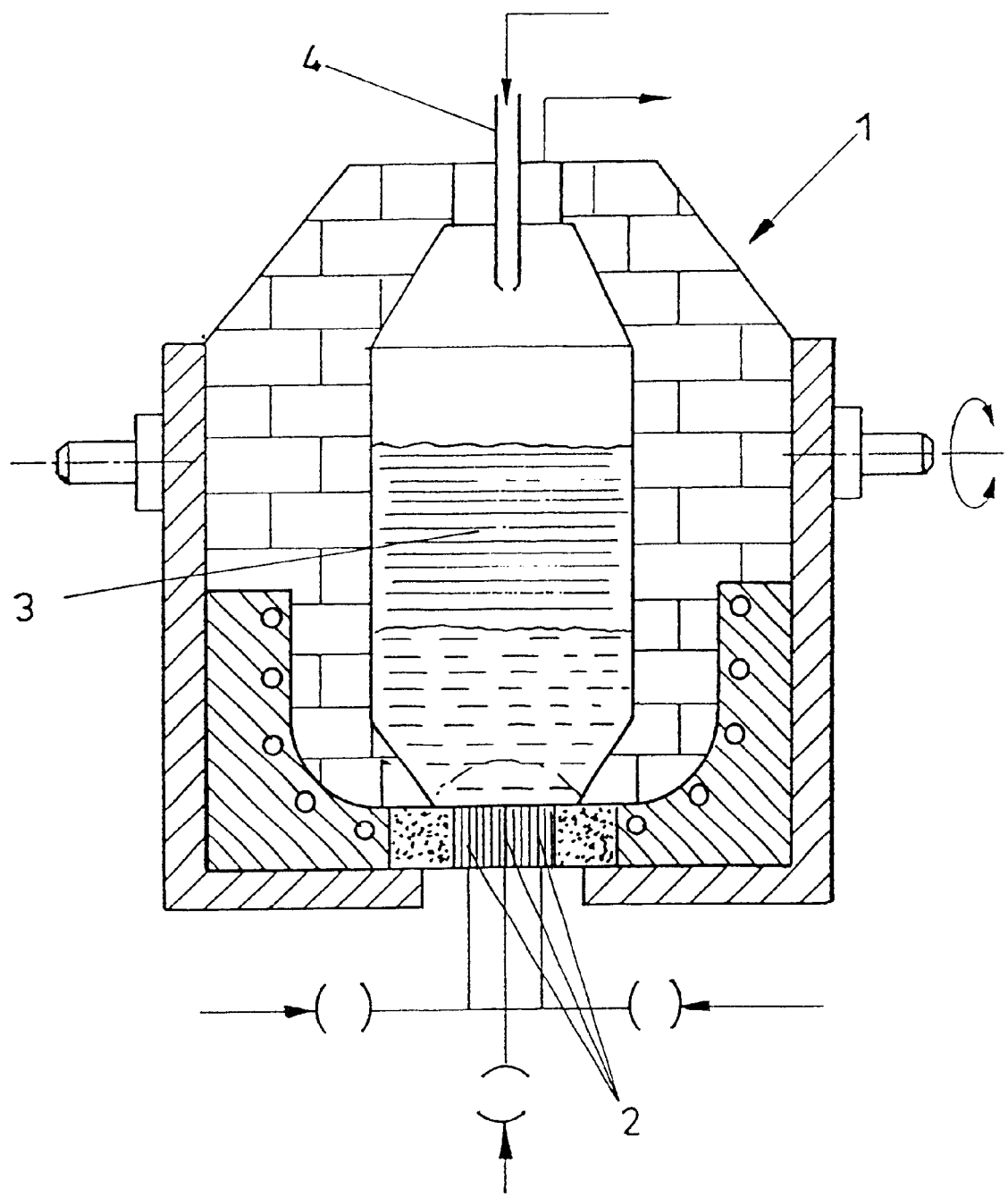

METHOD FOR TRANSFORMING SLAG DERIVED FROM NON-IRON METALLURGY

This application is the national phase of international application PCT/AT99/00066 filed Mar. 16, 1999 which designated the U.S.

BACKGROUND OF THE INVENTION

1. Field of the Invention

The invention relates to a method of converting slags derived from nonferrous metallurgy, in particular primary and secondary Ni and Cu metallurgical slags, while recovering and/or enriching the nonferrous metals and forming synthetic pozzolans.

2. Description of Related Art

Metallurgical slags containing Ni, Cu and Co occur primarily in nickel metallurgy. Fayalitic Ni metallurgical slags, generally, contain 1% by weight Ni, 0.7% by weight Cu as well as 0.25 Co. The slags occur as acidic slags, their basicities $CaO/SiO_2$ usually ranging between 0.1 and 0.4. Basically, such slags are suitable for the production of synthetic blast furnace slags upon addition of lime, yet direct use does not appear practicable on account of the high content of nonferrous heavy metals.

Oxidic slags occur not only in nonferrous metallurgy but, for instance, also in waste incineration or in the combustion of car shredder light fractions. Even those slags in most cases contain relatively high portions of nonferrous heavy metals.

EP-A 801 136 already suggested to work up oxidic slags of different origin and different contamination with heavy metal oxides or toxic substances by reducing the same above a metal bath containing an iron alloy. In that context, iron, iron-nickel, iron-copper or tin alloys were proposed as metal baths, wherein the redox potentional by the addition of aluminum, FeSi or carbon was adjusted such that FeO from the slag was metallically reduced to Fe not at all or only partially. The high admixtures of carbon regularly required in that connection presupposed the use of a high-quality coal, the metal bath having had to be adequately enriched with carbon. The submerged tuyeres required in this connection are relatively complex, calling for more or less sophisticated cooling means, since strongly exothermic reactions are being observed as carbon and oxygen are blown into iron alloys.

SUMMARY OF THE INVENTION

The invention aims to provide a method of the initially defined kind, by which slags derived from nonferrous metallurgy can be processed in a particularly simple manner and by the aid of particularly simple means, enabling the nonferrous metals to be recovered and/or enriched to a large extent. To solve this object, the method according to the invention essentially resides in that the molten oxidic slags are reduced with gases containing $H_2$ and CO such as, e.g., cracked gas in a first reduction stage above a metal bath containing Cu and/or Ni and optionally Co, wherein the redox potential of the $CO/H_2$ mixture is reduced by adding 10 to 40% by volume $H_2O$ vapor and/or $CO_2$ in order to hold off the reduction of Fe oxides, whereupon the remaining slag free of Cu and Ni is subsequently further reduced above an iron bath while using carbon in order to reduce the portion of Fe oxides so as to produce a slag free of Fe and nonferrous heavy metals. By directly using a copper or nickel bath, or providing a metal bath containing Cu, Ni and Co, instead of an iron bath optionally alloyed with nickel, the blowing in of carbon may be obviated and the thermal problems involved in the blowing of carbon/$O_2$ into iron baths may be avoided. A metal bath containing Cu, Ni and optionally Co according to the invention may be flushed with cracked gas, whereby the portion of hydrogen dissolves into the bath containing Cu, Ni and optionally Co and the respectively desired redox potential aimed to selectively separate nonferrous metals can be controlled in a simple manner by adjusting the contents of hydrogen and carbon monoxide in the gas. In principle, the portion of iron that is reduced from the slag is to be kept as low as possible, which is, of course, not readily feasible when blowing carbon into an iron bath. The redox potential sought may be defined, for instance, via the free enthalpy, wherein the respective values may be taken, for instance, from Richardson's diagram for the oxygen potentials of oxidic systems. Such a free enthalpy may be ensured in a particularly simple manner by the selection according to the invention, of gases containing $H_2$ and CO in order to adjust the redox potential, since the redox potential in the context of the invention may be appropriately varied by admixing $H_2O$ vapor, thereby enabling the use of a cracked gas produced according to a standard procedure. The hydrogen contained in the cracked gas is dissolved in the liquid crude copper melt as far as possible, thereby raising the reduction potential of the latter as compared to a heavy-metal-containing slag melt, whereas the carbon monoxide of the cracked gas to the largest extent possible may be passed through the bath and afterburned in the gas space of the converter. Such afterburning allows for the transfer of the chemical heat energy onto the multiple-phase melt bath to a particularly high degree in a simple manner in order to apply the reduction work of the heavy metals of the slag melt and compensate for the heat losses of the converter. If desired, the slag melt may be adjusted to the requirements of a high-quality cement aggregate and a basicity CaO to $SiO_2$ of about 1.5 and an $Al_2O_3$ content of around 15% by weight. The first reduction stage using cracked gas can, thus, be controlled in a very precise manner by choosing the respectively required admixtures of $H_2O$ vapor ranging between 10 and 40% by volume such that the portion of iron oxides of the slag which are reduced into the metal bath can actually be kept low so as to immediately attain an excellent regulus capable of being readily supplied to recovering said nonferrous heavy metals or nonferrous metals.

The respective reduction equilibrium is described by the socalled Baur-Glaessner diagram, from which results that the method according to the invention in a particularly advantageous manner may be realized such that cracked gas having a composition of 10 to 75% by vol. CO, based on $CO_2$ and CO, and 3 to 55% by vol. $H_2$, based on $H_2O$ and $H_2$, is used in the first reduction stage.

The method control according to the invention in a particularly advantageous manner is suitable for the processing of slags poor in iron and derived from Ni and Cu smelting. In the event of slags rich in iron, the method advantageously is carried out in a manner that a fayalitic slag is formed in order to appropriately reduce the temperature of the slag melt and facilitate the handling of the slag by lowering the slag viscosity. In those cases, it is advantageously proceeded according to the invention in a manner that, if magnetite or iron spinel is present in the starting slag, the reaction to FeO and the formation of fayalitic slags are effected in a previously provided reduction stage. In doing so, the fayalitic slag is formed by reacting the FeO formed with the $SiO_2$ contained in the slag.

As already mentioned in the beginning, the chemical heat of the cracked gas advantageously may be utilized in that cracked gas is passed through the bath containing Cu and/or Ni and optionally Co, and the gas passing the slag is burned in the gas space provided above the slag.

Slags derived from the combustion of shredder light fractions as well as other slags mainly containing nonferrous heavy metals may be added to the primary and secondary Ni and/or Cu metallurgical slags. The acidic character of such slags enables the desired fayalatic slag composition to be adjusted in a simple manner.

DETAILED DESCRIPTION OF EMBODIMENTS OF THE INVENTION

By the method according to the invention, a primary slag derived from nickel smelting and having the following directional analysis

| Component | Portion (% by Wt.) |
|---|---|
| CaO | 2.8 |
| $Fe_2O_3$ | 52 |
| $SiO_2$ | 32 |
| $Al_2O_3$ | 6 |
| MgO | 2 |
| Cu | 0.2 |
| Ni | 0.4 |
| Co | 0.2 |
| Cr | 0.5 |
| S | 1.5 | in a two-stage reduction process was worked to a slag largely free of metals and having the following composition:

| Component | Portion (% by Wt.) |
|---|---|
| $SiO_2$ | 73 |
| $Al_2O_3$ | 13 |
| MgO | 4 |
| CaO | 6.5 |
| S | 0.8 |

A slag of that composition exhibits pozzolanic properties, wherein cracked gas was employed in the first reduction stage and a Cu—Ni—Co-alloy was drawn off. The fayalitic slag melt, which was largely free of nonferrous heavy metals, was then subjected to a strong reduction in an iron bath reactor using carbon, whereby an iron-chromium alloy could be obtained. The largely metal-free slag could subsequently be granulated and appropriately crushed, the two reducion steps having been carried out in separate converters.

With such target slags, granulation in a simple manner may be carried out also by the aid of cold air, since the speed of crystal formation in such acidic slags is substantially lower as compared to that of basic slags. The pozzolan obtained in terms of composition largely corresponds to natural pozzolans such as, for instance, Santorin earth, trass or puzzolans from the working sites of Bacoli and Segni. Only puzzolans coming from Sacrofano are characterized by lower contents of aluminum oxide.

The water gas or cracked gas used according to the invention may be taken from a conventional gas reformer to which natural gas, methane, fuel oil or coal or even alternative fuels such as, e.g., pyrolysis oil are supplied along with oxygen, water and $CO_2$ for neutralization. The method may be carried out in a melter calciner, which may be designed as a discontinuous rotary/pivotable tubular kiln and comprise solid fuel burners. Through such solid fuel burners may be supplied even the inorganic parts of RESH such as, in particular, slags derived from shredder light fractions, which likewise constitute largely acidic slags and may have relatively high contents of copper, nickel, chromium and zinc. In order to safeguard that sulfur-free slags will be treated above the copper metal bath, desulfurization or sulfur oxidation may be effected in a previously arranged converter or in the first converter, whereupon reduction with a sulfur-free cracked gas will take place subsequently.

Cracked gas without the addition of $H_2O$ vapor provided by the invention has a redox potential capable of reducing also iron oxides. Neutralization with a water vapor portion of up to 40% by volume, however, will do to render the reducing action of the cracked gas sufficiently weak so as to prevent any additional slag iron oxide from being reduced.

Because of its dissolving potential, the Cu—Ni—Co-alloy exhibits a redox buffering action on atomic hydrogen, the good thermal conduction of the Cu—Ni—Co-alloy charged being of beneficial advantage to the heat transfer from the gas into the melt phase. After having separated the nonferrous metals from the slag, iron oxides can be reduced from the slag using known techniques by applying carbon so as to considerably enhance the iron content of the slag and hence the sphere of application of the pozzolonic products formed.

BRIEF DESCRIPTION OF THE DRAWING

A particularly simple device for carrying out the method according to the invention is illustrated in the drawing.

The drawing depicts a pivotable converter 1 which is charged with a bath containing Cu, Ni and optionally Co as well as the fayalitic slag melt containing nonferrous metals. The cracked gas or water gas required for reduction may be produced either in the converter itself or in a previously arranged gas reformer. For the production of water gas, water vapor and optionally oxygen as well as natural gas are fed through bottom tuyeres 2, wherein the cracked gas passed through the copper bath may be burned above the slag melt 3 while top-blowing hot air through a lance 4, in order to apply the required melting heat and the lost heat. The adjustment of the redox potential in this case may be effected in a manner that not only Cu, Ni and Co, but optionally also zinc and lead are already reduced such that a molten slag free of nonferrous heavy metals yet still containing iron oxides will remain, which may subseqently be treated in the same converter after having replaced the metal bath with an iron bath, or in a similarly designed separate converter, in order to reduce the residual iron content, and optinally the residual chromium content, from the slag melt into the metal bath.

What is claimed is:

1. A method of converting slag derived from nonferrous metallurgy, said method comprising:

providing molten oxidic slag Fe oxides and nonferrous metals derived from nonferrous metallurgy; and reducing the molten oxidic slag in multiple stages comprising:

a first reduction stage conducted above a nonferrous metal bath containing at least one metal selected from the group consisting of Cu and Ni and optionally containing Co, the first reduction stage comprising reducing the nonferrous metals in the molten oxidic slag with gas containing $H_2$ and CO and adding 10% to 40% by volume of at least one member selected from the group consisting of $H_2O$ vapor and $CO_2$ to reduce the redox potential of the gases containing $H_2$ and CO to thereby limit reduction of Fe oxides; and a subsequent stage conducted above an iron bath, the subsequent stage comprising reducing remaining Fe oxides in the molten oxidic slag with carbon to produce a slag free of Fe and nonferrous metals.

2. A method according to claim 1, wherein the molten oxidic slag comprises at least one member selected from the group consisting of magnetite and iron spinel, and wherein said method further comprises pre-reacting the molten oxidic slag to form FeO and fayalitic slag.

3. A method according to claim 1, wherein the gas comprises cracked gas.

4. A method according to claim 3, wherein the cracked gas used in the first reduction stage has a composition comprising 10% to 75% by volume of CO, based on $CO_2$ and CO, and 3% to 55% by volume of $H_2$, based on $H_2O$ and $H_2$.

5. A method according to claim 3, further comprising passing the cracked gas through the nonferrous metal bath and thereafter burning the cracked gas in a space above the molten oxidic slag.

6. A method according to claim 4, further comprising passing the cracked gas through the nonferrous metal bath and thereafter burning the cracked gas in a space above the molten oxidic slag.

* * * * *